June 21, 1949.  C. W. HANSELL  2,474,049
HIGH-SPEED TELEGRAPHY SIGNAL RECORDER
Filed March 26, 1945  2 Sheets-Sheet 1
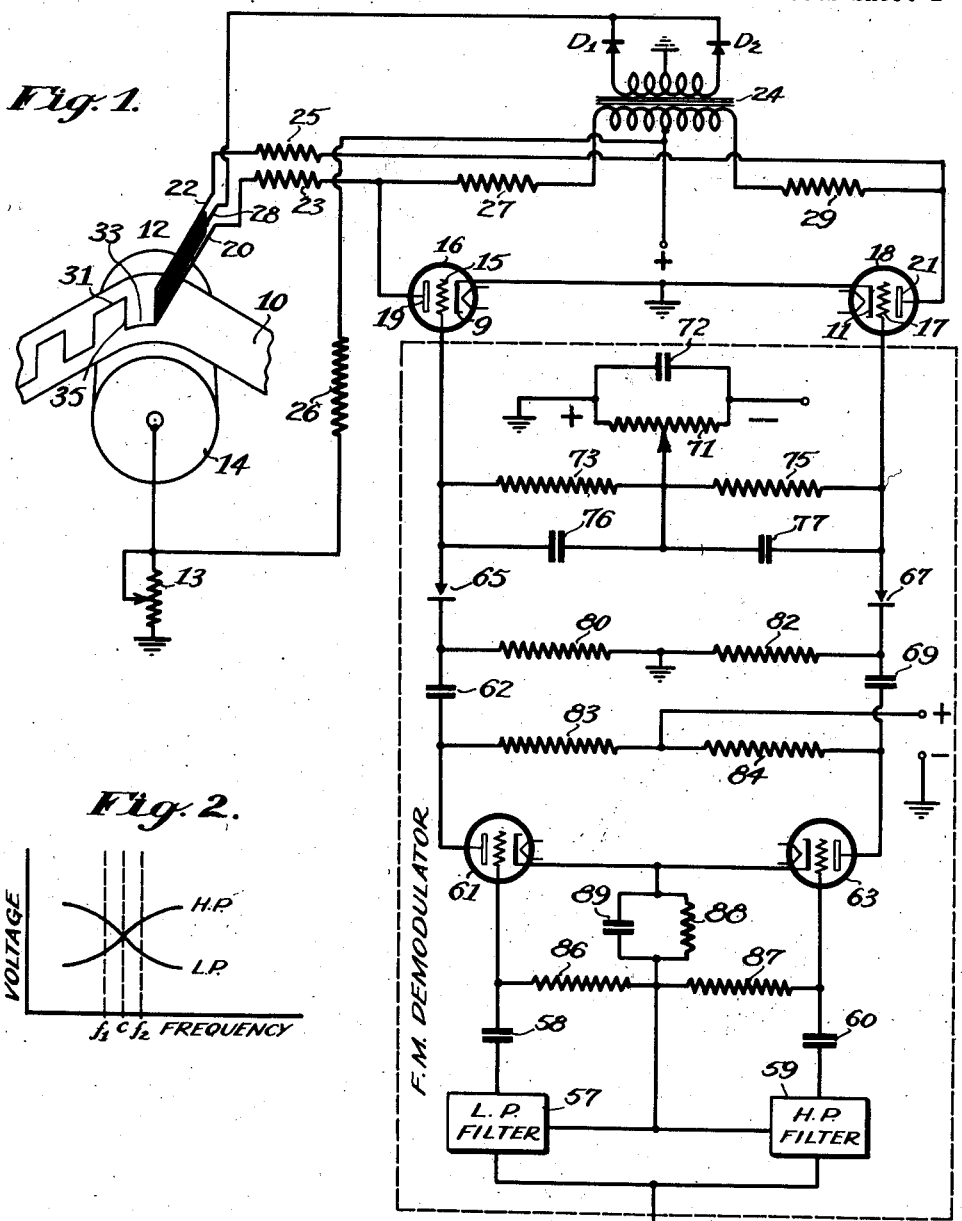
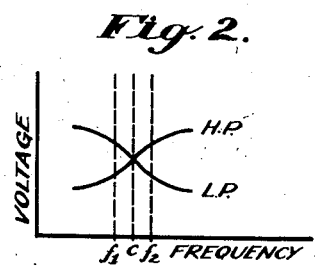
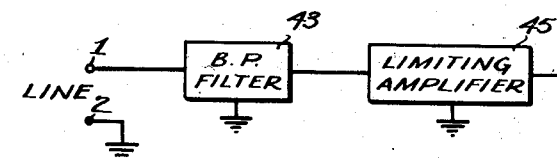
INVENTOR.
CLARENCE W. HANSELL
BY
ATTORNEY

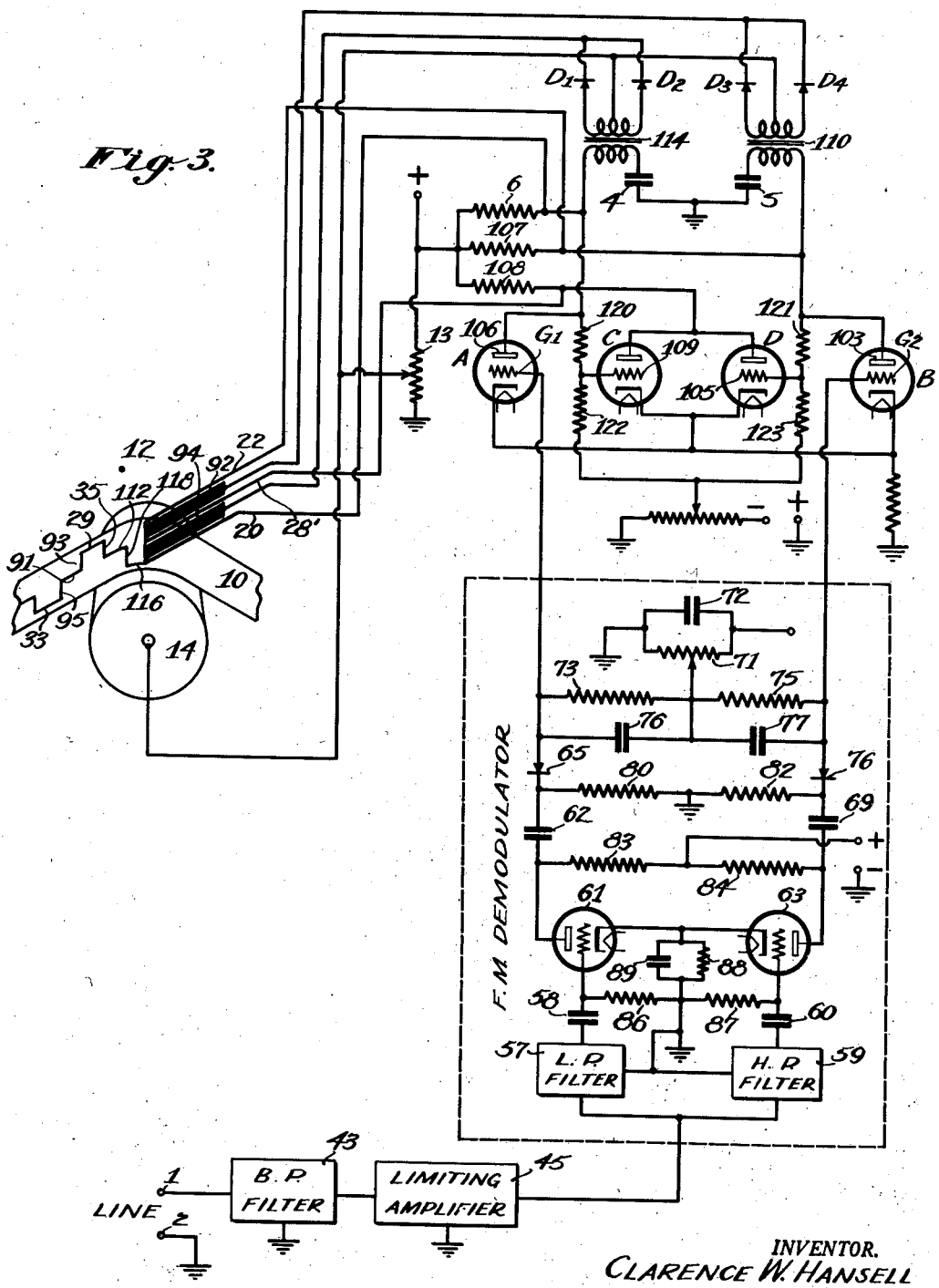

Patented June 21, 1949

2,474,049

UNITED STATES PATENT OFFICE 2,474,049

HIGH-SPEED TELEGRAPHY SIGNAL RECORDER

Clarence W. Hansell, Port Jefferson, N. Y., assignor to Radio Corporation of America, a corporation of Delaware Application March 26, 1945, Serial No. 584,859

7 Claims. (Cl. 178—89)

This application discloses a new and improved method of and means for recording signals represented by direct current potentials of variable amplitude or by alternating current potentials. The signals may be of any character such as, for example, telegraphy and other code signals.

Recording methods and means known in the prior art are somewhat complicated in nature and operation, and a general object of my invention is to improve and simplify signal recording.

Many of the recording systems known in the prior art have mechanical parts such as styluses or pens which must be moved during operation. Because of mechanical inertia and limits to maximum obtainable electrically produced magnetic actuating forces, the speeds at which these recorders can be operated satisfactorily is limited. A second general object of my invention is provision of a recorder which has no mechanical parts in the marking apparatus per se that must move in response to signals during operation. This insures or permits an increase in the speed at which signals of the nature described hereinbefore may be recorded.

The manner in which the above objects are attained and others, and the advantages gained by attaining such objects and others will be understood from the detailed description which follows. In this description reference will be made to the attached drawings wherein Fig. 1 represents a schematic diagram of my improved recording system for international Morse code signals, Fig. 2 is a representation of an FM discriminator characteristic, and Fig. 3 a schematic diagram of my improved recording system for cable code signals.

In the drawings of Fig. 1, 10 is a recording medium such as, for example, a tape which is treated or sensitized for electrolytic recording. Recording medium 10 is moved with respect to recording elements in the form of spring wire fingers or brushes designated generally at 12, which bear on the recording medium or tape. If the recording medium is in the form of a tape it may be moved with respect to the brushes 12 by a driven drum 14 which may be of metal to also serve to complete the circuit from the brushes 12 to ground, and to the cathodes 9 and 11 of a pair of electron discharge devices 16 and 18. The devices 16 and 18 have their control grids 15 and 17 excited differentially or in pushpull relation by varying direct current or alternating current representing the code signals or other signal elements to be recorded. These currents may be provided as desired in various ways from signals coming in on lines 1 and 2. Specific means for applying the currents representing signals to the grids 15 and 17 will be described hereinafter. The anodes 19 and 21 of the tubes 16 or 18 are connected by resistors 23 and 25 respectively to separately insulated brush or spring elements 20 and 22. These spring elements may be single conductors or a plurality of conductors as desired. In the sake of simplicity of representation they are shown as single conductors. The anodes 19 and 21 of the tubes 16 and 18 are also connected by resistances 27 and 29 to the primary winding of a transformer 24, the secondary winding of which is connected at its outer terminals by rectifiers D1 and D2 to a group of separately insulated spring or brush elements 28. A point on the secondary winding of transformer 24 is grounded thereby completing the rectifier circuit. A source of positive potential is connected to the anodes by way of the center point of the transformer primary winding.

In operation the tape 10 is moved over the drum 14 to pass underneath the brushes 20, 22 and 28. The differential voltages applied to the grids 15 and 17 of tubes 16 and 18, representing signals, causes differential variations in the effective resistance between the anodes and the cathodes of the tubes 16 and 18, which, in turn, causes differential variations in the potential and current applied to spring brush elements 20 and 22. Assume that say tube 16 is highly conductive and tube 18 has low or even zero conductivity, then the potential and current between brush 20 and roller 14 may be small, or zero, while that between brush 22 and roller 14 may be relatively large. The wire or brush elements 22 then produce on the tape 10 a mark as indicated at 31. Now when the signal voltage is shifted to throw the unbalance between anode currents of tubes 16 and 18 the other way then current is caused to be cut off or reduced in tube 16 and to flow through tube 18. This causes the potentials on brushes 20 and 22 to change so that brush 20 instead of brush 22 will carry current and make a mark on the moving tape as indicated at 33. At the moment when current is transferred from one tube to the other, and from one brush to the other, a transient potential is made to appear across the primary winding of transformer 24 so that a pulse of current is induced in the secondary winding of this transformer through rectifier D1 or D2 to cause a pulse of direct current to flow in the correct direction through brushes 28 to roller 14 and to ground and back to the mid-point of the secondary winding to produce a marking such as indicated at 35 on the tape.

As stated above, the differentially applied voltages may represent signals of any type, such as for example, signals of the two condition international Morse code, and may be originally either direct current potentials or alternating current potentials.

In the embodiment there is illustrated a more or less conventional terminal equipment for the purpose of converting on-off keyed audio carrier current telegraph line signals into a form usable in the present invention. For the purpose of illustration I have assumed that the carrier current signal coming in on lines 1 and 2 is a frequency modulated tone wave. The average tone frequency may be anywhere from a few hundred cycles up to about 5000 cycles per second (or the maximum capability of the line). The total frequency shift may be in the order of 500 to 1000 cycles. This F-M keyed or modulated tone wave passes through a band pass filter 43 which screens out all frequencies in the line except the desired signal frequencies. The signal next passes through the limiting amplifier stage 45 which may amplify or repeat but which removes substantially all amplitude modulation so that only pure F-M signals are fed into low pass filter 57 and high pass filter 59. These filters 57 and 59 are designed so that their cutoff regions are elongated into a certain desired slope and so that these slope characteristics, designated L. P. and H. P. respectively in Fig. 2, cross in a manner shown in Fig. 2 with their intersection point occurring at the effective mean tone signal carrier frequency designated C in Fig. 2. Then the space and mark frequencies appear on each side as indicated by $f1$ and $f2$ in Fig. 2. The currents passed by the filters 57 and 59 are fed by coupling condensers 58 and 60 to the grids of amplifier tubes 61 and 63. The tubes 61 and 63 amplify the signal components passing through filters 57 and 59. The outputs of tubes 61 and 63 are passed through coupling condensers 62 and 69 and then through detectors, or rectifiers, 65 and 67, which are in turn connected to the grids 15 and 17 of tubes 16 and 18 respectively. These grids 15 and 17 are biased positively by a small amount from potentiometer 71 and a source not shown, through resistors 73 and 75. These two latter resistors also act as output loads on the pushpull detectors 65 and 67. Condensers 76 and 77 act as carrier frequency by-passes but do not interfere substantially with the demodulated signal. Resistors 80 and 82 complete the detector circuit on the anode side of tubes 61, 63. It should be noted that detectors 65 and 67 may be of the copper oxide or the selenium type or they may consist of rectifying vacuum tubes. Likewise, resistors 83 and 84 with resistors 86, 87, and 88 complete the amplifier circuit of tubes 61 and 63.

The action is as follows: Assume the space position $f1$ in Fig. 2. Then in Fig. 1 filter 57 passes more signal than filter 59 so that tube 61 and detector 65 amplifies and rectifies more signal energy and the grid 15 of tube 16 becomes more negative while by similar reasoning filter 59 passes less signal so that tube 63 and rectifier 67 amplifies and rectifies less signal energy so the grid 17 of tube 18 becomes less negative. Now assume the mark position $f2$ in Fig. 2. Then in Fig. 1 filter 59 passes more signal and filter 57 passes less signal. Using the same reasoning as before, the grid 17 of tube 18 becomes more negative this time and the grid 15 of tube 16 becomes more positive. In the carrier position C both tubes 16 and 18 have substantially equal grid bias. This average bias may be adjusted by means of potentiometer 71.

Now it can be seen that the mark and space characters of the signal cause alternate changes of grid potential of tubes 16 and 18. Consequently the anodes of tubes 16 and 18 have similar but amplified alternate changes in current and voltage and these are used in the manner described hereinabove to operate the recorder of the present invention.

Each transition from mark to space, or from space to mark, causes pulses of rectified current to be supplied to brushes 28, to produce a line 35 joining the ends of mark-space lines 31 and 33 on the tape, thus completely simulating the type of record made on a moving paper tape by a moving pen undulator recorder.

In the circuit, resistances 25 and 23 are shown in series with the connections to brushes 20 and 22 for the purpose of making the flow of current to the brushes more nearly independent of the resistance between the brushes and the roller 14, so as to provide for more uniform marking.

Fixed resistance 26 and adjustable resistance 13 are for the purpose of adjusting the potential on roller 14 to be somewhat above ground potential so that minimum positive potential on either of brushes 20 or 22 will result in zero potential between the brush and roller 14, so that marking due to electrolytic reaction on the tape may be brought to zero.

It may be pointed out that this type of recorder illustrated in Fig. 1, is suited for producing records of received signals of the same kind as are now produced by so-called undulator recorders which are a type of moving pen recorder used in considerable numbers for transoceanic radio communication. Whereas the undulators have been developed for maximum speeds corresponding to about 350 to 400 words per minute in international Morse code the present invention provides a means to work at much higher speeds.

Because the functioning is entirely electrical, mechanical inertia and limits of electromagnetic force for overcoming its effects are not met with in the present recorder. Therefore the recording speed is limited only by the ultimate speed of electrolytic recording, which is much higher than the limit in the undulator recorders of the prior art.

The art of electrolytic recording has been quite fully developed for recording facsimiles and is still a subject for further intensive development. I would expect that full advantage of this existing art would be taken in exploiting the present invention.

In Fig. 3 is shown a further development of this invention which is an adaptation for recording cable code.

As the operation of the F-M demodulator has already been explained above, the explanation of Fig. 3 which follows will start with the negative signals at the grids G1 and G2 of tubes A and B, corresponding to the input to the grids 15 and 17 of tubes 16 and 18 of Fig. 1.

It is well known that in cable code there are three conditions of the signal, namely, plus, minus and zero, corresponding to dot, dash, and space of the international Morse two position code. On the recorder tape, dot is above the center line of the tape, dash is below the center line of the tape and the space is on the center line.

In the use of frequency shift keying, for cable code telegraph, there are three signal conditions represented by three equally spaced values of carrier frequency, the higher of which is dot frequency current; the lower dash frequency current and the center the space frequency current.

It is evident that a dot; a dash; or a space signal cannot occur simultaneously. For this reason tube B in Fig. 3 receives the dot signal at a different time than the time tube A receives a dash signal.

The signal recording means in Fig. 3 is similar to that in Fig. 1 except that there are more brushes than in Fig. 1, which increase in number is necessary to record the space part of the cable code signal and to record the two shifts between dot and space and space and dash. The dot brush is shown at 22, the dash brush is shown at 20, the space brush is shown at 28', the shift-between-dot-and-space brush is shown at 92, and the shift-between-dash-and-space brush is shown at 94, and the respective recorded marks are shown on tape 10 as at 29, 33, 91, 93 and 95.

As in Fig. 1, so in Fig. 3, the tubes receiving the negative signals on their grids become non-conductive when the negative signals are impressed and conduct strongly when no signals are present. In the embodiment illustrated in Fig. 3 the signal at lines 1, 2, dots and dashes are at f2 and f1 respectively, and space is at C.

When potential representing a dot signal is impressed on the grid G2 of tube B, in Fig. 3, that tube is cut off, and the potential drop across resistor 107 is reduced, causing the voltage on the plate 103 of tube B to rise, which, in turn, makes the potential on the grid 105 of tube D increase so that tube D conducts strongly. Now, with dot signal on the grid of tube B, tube B is cut off, tube D is conducting strongly, tube A is conducting strongly so that its anode 106 potential falls as does the potential on the grid 109 of tube C, and tube C is cut off or very weakly conducting. Tubes C and D are in parallel, however, and D is conductive so that the potential at the anode end of resistance 108 does not rise materially. However, at this same time the high voltage on the plate 103 of tube B is also on brush 22 and a dot trace is made on the tape as at 29. When the dot signal ceases the potential on grid G2 rises and tube B becomes strongly conductive to make the grid 105 of tube D negative, tube D is cut off or becomes weakly conducting. The sudden establishment of current through tube B causes a sudden drop in potential on the plate 103 of tube B due to the increase in voltage drop across resistance 107. This sudden drop in potential causes a transient in the primary of transformer 110 which results in a pulse of D.-C. voltage through the rectifiers D3 or D4 which is impressed on brush 92, and a trace is made on the tape as at 35 between the end of the dot trace 29 and space trace 112. When tube D was cut off neither tube C nor tube D was then conducting, and the potential on their plates and at the anode end of resistance 108 increased and this high potential, also applied to brush 28' causes the space trace 112 to be recorded. As long as neither dot nor dash signals are present, tubes C and D are substantially cut off and have a high plate potential and brush 28' causes a continuous space trace to be recorded. When a dash signal comes in the potential on grid G1 becomes negative, tube A is cut off and its plate 106 potential rises suddenly to make the grid 109 of tube C more positive and tube C conducts strongly, stopping the space trace on the tape. The sudden rise in voltage on the anode 106 causes a transient in the primary of transformer 114 which causes a pulse of D.-C. voltage through the rectifiers D1 or D2 to be impressed on brush 94 which makes a trace between the space trace 112 termination and the initiation of the dash trace 116, as at 118. Also the sudden rise of potential on the plate 106 of tube A causes brush 20 to make a dash trace 116 on the tape. It is easily understood that a transition from dash-to-space-to-dot will be the result of the above-explained operation taken in the reverse order and the resulting traces would appear on the tape as at 33, 95, 91, 93 and 29.

In operation then, tubes B and A are cut off alternately for dots and dashes. This in turn turns on D or C during dots and dashes so that one or the other carries current to prevent space marking on the recorder. For spaces A and B both carry current and cause C and D to be cut off, so that space mark is made on the record.

A transition directly from dot to dash, or vice versa, results in transient currents to brushes 94, 92 and 28' to draw a vertical line on the record tape all the way across from the lines representing dots and dashes. Thus the circuit arrangement of Fig. 3 will record three position frequency shift carrier current signals into a three line or three position record on a moving tape closely simulating the undulating pen recorders now commonly used for recording the cable code.

The resistances 120, 121, 122 and 123 are so dimensioned as to properly relate the potentials (as developed by tube current) at the anodes 106 and 103 to the desired biases at the grids 109 and 105 of tubes C and D to obtain the operation described above.

What is claimed is:

1. A means for simulating the records made by an undulator recorder of telegraph signals, comprising two contact elements energized alternately for impressing marks along two substantially parallel spaced lines on a moving tape and a third element energized transiently as the energy is alternated from one contact element to the other, said third element making marks along lines approximately at right angles to said two spaced parallel lines.

2. In a tape recorder, a sensitized tape and means for moving the same with respect to a plurality of conductive elements spaced across the path of movement of said tape, two electron discharge tubes differentially excited by potentials representing signals, connections including at least one of said elements in a circuit completed through said tape and associated with one of said tubes, connections including at least one other of said elements in a circuit completed through said tape and associated with the other of said tubes, and transformer means coupling the outputs of said tubes to a rectifier system in a circuit including still other of said elements and completed through said tape.

3. In a recorder for potentials which are varied in intensity from a first value to a second value in accordance with signals, a sensitized material and means for moving the same, a plurality of conductive elements arranged to bear on said material during the movement thereof, two electron discharge devices differentially excited by said potentials, connections including at least one of said elements in a direct current circuit completed through said material and associated with one of said devices, connections including at least one other of said elements in a circuit completed through said material and associated with the other device, transformer means coupling the outputs of said devices to a rectifier, and a direct current circuit including other of said elements and said rectifier.

4. In apparatus for recording potentials which represent signals, a sensitized tape and means for feeding the same along a path, a plurality of conductive elements arranged in a plane traversing the path of movement of the tape and also arranged to bear on said tape during the movement thereof, two electron discharge devices having input and output electrodes, connections for applying said potentials in pushpull relation to the input electrodes of the devices, a direct current circuit completed through said tape and including a source of potential and at least one of said elements, means coupling the output electrodes of one of said devices in parallel with a part at least of said direct current circuit, a second direct current completed through said circuit and including a source of direct current potential and at least one other of said elements, means coupling the output electrodes of the other device in parallel with a part at least of said second direct current circuit, a transformer having a primary winding coupled in pushpull relation to the output electrodes of said devices, said transformer having a secondary winding, a rectifier system connected to said secondary winding, and a direct current circuit completed through said tape and including at least one other of said elements and said rectifier system.

5. In a tape recorder for potentials representing signals, a sensitized tape and means for moving the same with respect to a plurality of conductive elements spaced across the path of movement of said tape, two electron discharge tubes having output electrodes and having input electrodes differentially excited by said potentials, connections including a source of current and at least one of said elements in a circuit completed through said tape, connections coupling the output electrodes of one of said tubes in shunt to a part at least of said circuit, connections including a source of current and at least one other of said elements in a circuit completed through said tape, connections coupling the output electrodes of the other tube in shunt to a portion at least of said last named circuit, separate transformer means coupling the output electrodes of each of said tubes to separate rectifier circuits each including a plurality of different ones of said elements and completed through said tape, connections including a source of direct current and at least one other of said elements in a circuit completed through said tape, two electron discharge devices each having output electrodes coupled in parallel in shunt to a part at least of said last mentioned circuit, a coupling between the input electrodes of one device and the output electrodes of one of said first two tubes, and a coupling between the input electrodes of the other device and the output electrodes of the other of said tubes.

6. In a tape recorder for potentials representing signals, a sensitized tape and means for moving the same with respect to a plurality of conductive elements spaced across the path of movement of said tape, two separate direct current circuits completed through said tape, one circuit including one of the outermost of said elements, the other circuit including the other of the outermost of said elements, a third direct current circuit completed through said tape and including one of said elements intermediate said outer elements, two electron discharge tubes each having output electrodes and having input electrodes differentially excited by said potentials, connections between the output electrodes of one tube and one of said two separate circuits, connections between the output electrodes of the other tube and the other of said two separate circuits, a first rectifier circuit completed through said tape and including the elements between said intermediate element and one of said outer elements, a second rectifier circuit completed through said tape and including the elements between said intermediate element and the other of said outer elements, two electron discharge devices having output electrodes coupled in parallel and connected to said third circuit including said intermediate element, a coupling between the input electrodes of one device and the output electrodes of one of said first two tubes, and a coupling between the input electrodes of the other device and the output electrodes of the other of said two tubes.

7. In apparatus for recording potentials, which vary between two limiting values in accordance with telegraph signals, on a moving sensitized tape, a plurality of conducting elements bearing on the tape, tube means controlled by said potentials for producing electron current flow through at least one of said elements and tape in the presence of potential of one of said limiting values, a circuit including reactance operative when said potentials vary from said one limiting value to said other limiting value for producing oscillations, a rectifier for rectifying said oscillations to derive direct current, a circuit connecting said rectifier to a plurality of said elements and said tape to pass current therethrough and tube means controlled by said potentials for producing direct current flow through at least one other of said elements and the tape in the presence of potentials of the other of said limiting values.

CLARENCE W. HANSELL.

REFERENCES CITED

The following references are of record in the file of this patent:

UNITED STATES PATENTS

| Number | Name | Date |
|---|---|---|
| 316,693 | Hoevenbergh | Apr. 28, 1885 |
| 650,096 | Rodde | May 2, 1900 |
| 907,235 | Herrick | Dec. 22, 1908 |
| 1,725,533 | Lee | Aug. 20, 1929 |
| 1,941,001 | Hansell | Dec. 26, 1933 |